United States Patent [19]
Huys et al.

[11] 3,832,802
[45] Sept. 3, 1974

[54] APPARATUS AND METHOD FOR CULTIVATING PLANTS

[76] Inventors: Theodore H. J. Huys, Oude Vonkelweg 2 Broekhuizen, Limburg; Peter J. M. Donkers, Mutshoek 36, Boekel, N-Brant, both of Netherlands

[22] Filed: Feb. 12, 1973

[21] Appl. No.: 331,915

[52] U.S. Cl. .............................. 47/1.1, 214/16.4 A
[51] Int. Cl. .......................... A01g 1/04, B65g 1/06
[58] Field of Search ............ 214/16.4 A; 47/1.1, 17, 47/1.2

[56] References Cited
UNITED STATES PATENTS

| | | | |
|---|---|---|---|
| 805,801 | 11/1905 | Kline | 47/1.1 |
| 1,121,722 | 12/1914 | Fessenden | 47/17 |
| 1,753,980 | 4/1930 | Baumgartner | 47/17 |
| 3,461,605 | 8/1969 | Stanhope | 47/17 |
| 3,610,445 | 10/1971 | Kitchen et al. | 214/16.4 A |
| 3,664,534 | 5/1972 | Hunter | 214/16.4 A X |
| 3,717,953 | 2/1973 | Kuhn et al. | 47/1.1 |

*Primary Examiner*—Robert E. Bagwill
*Attorney, Agent, or Firm*—Seidel, Gonda & Goldhammer

[57] ABSTRACT

Plants, such as mushrooms, are cultivated in elongated containers reciprocally supported in air-conditioned chambers. The elongated containers are supported by rollers so that they may be removed horizontally from their chamber for processing and then returned to their chamber. The air-conditioned chambers are open only at one end.

6 Claims, 5 Drawing Figures

PATENTED SEP 3 1974 3,832,802
FIG. 1
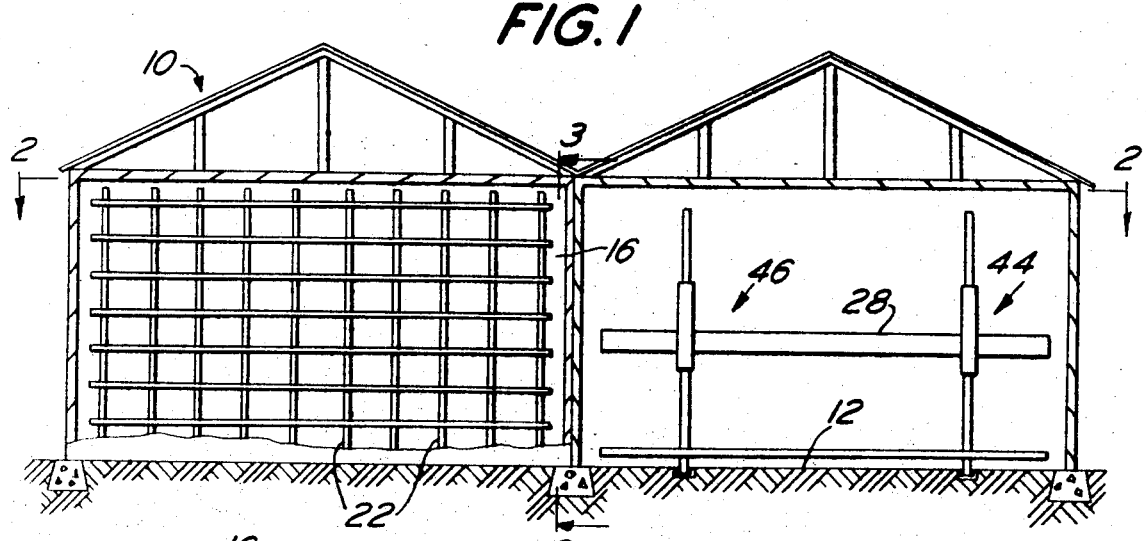
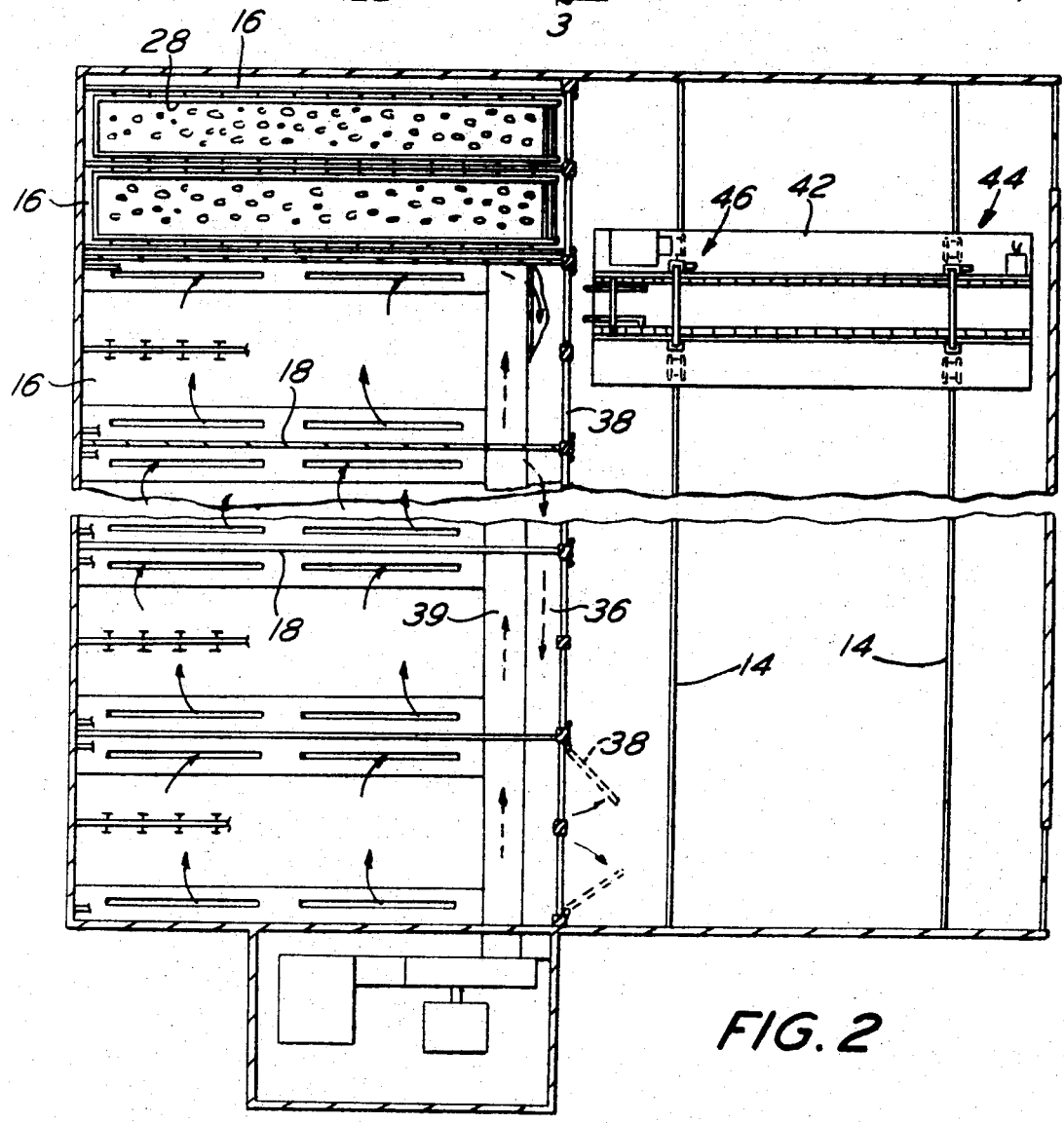
FIG. 2

APPARATUS AND METHOD FOR CULTIVATING PLANTS

In U.S. pending application Ser. No. 197,432 filed Nov. 10, 1971 and entitled APPARATUS FOR CULTIVATING PLANTS, now U.S. Pat. No. 3,719,953, there is disclosed apparatus wherein plants such as mushrooms are cultivated in a nutrient medium contained in receptacles which are stacked upon each other. In said application, the receptacles are moved in a vertical direction from their air-conditioned storage chamber to a processing area. Special elevator devices are needed to move the receptacles from the storage area to the processing area.

In accordance with the present invention, the containers are elongated so as to be substantially longer than the containers disclosed in the above-mentioned pending application. In this invention, the containers are disposed in air-conditioned chambers whereby the plants may be subjected to the same type of air flow patterns found desirable as disclosed in the above-mentioned patent application.

In accordance with the present invention, the air-conditioned chambers are closed at one end. The containers are removable in a horizontal direction from their respective chambers and returned in the same manner. The containers are disposed one above the other in the specific chamber and supported by rollers or other equivalent devices so that they may be easily removed from and inserted into their respective chamber.

The apparatus and method of the present invention is simpler and less expensive. Thus, it is a primary object of the present invention to provide apparatus and method for cultivating plants such as mushrooms in a manner whereby the containers are supported on rollers or other devices in an air-conditioned chamber so that they may be removed from only one end of the chamber.

For the purpose of illustrating the invention, there is shown in the drawings a form which is presently preferred; it being understood, however, that this invention is not limited to the precise arrangements and instrumentalities shown.

FIG. 1 is a schematic vertical sectional view of the structure incorporating the present invention.

FIG. 2 is a plan layout of the structure shown in FIG. 1.

Figure 3:
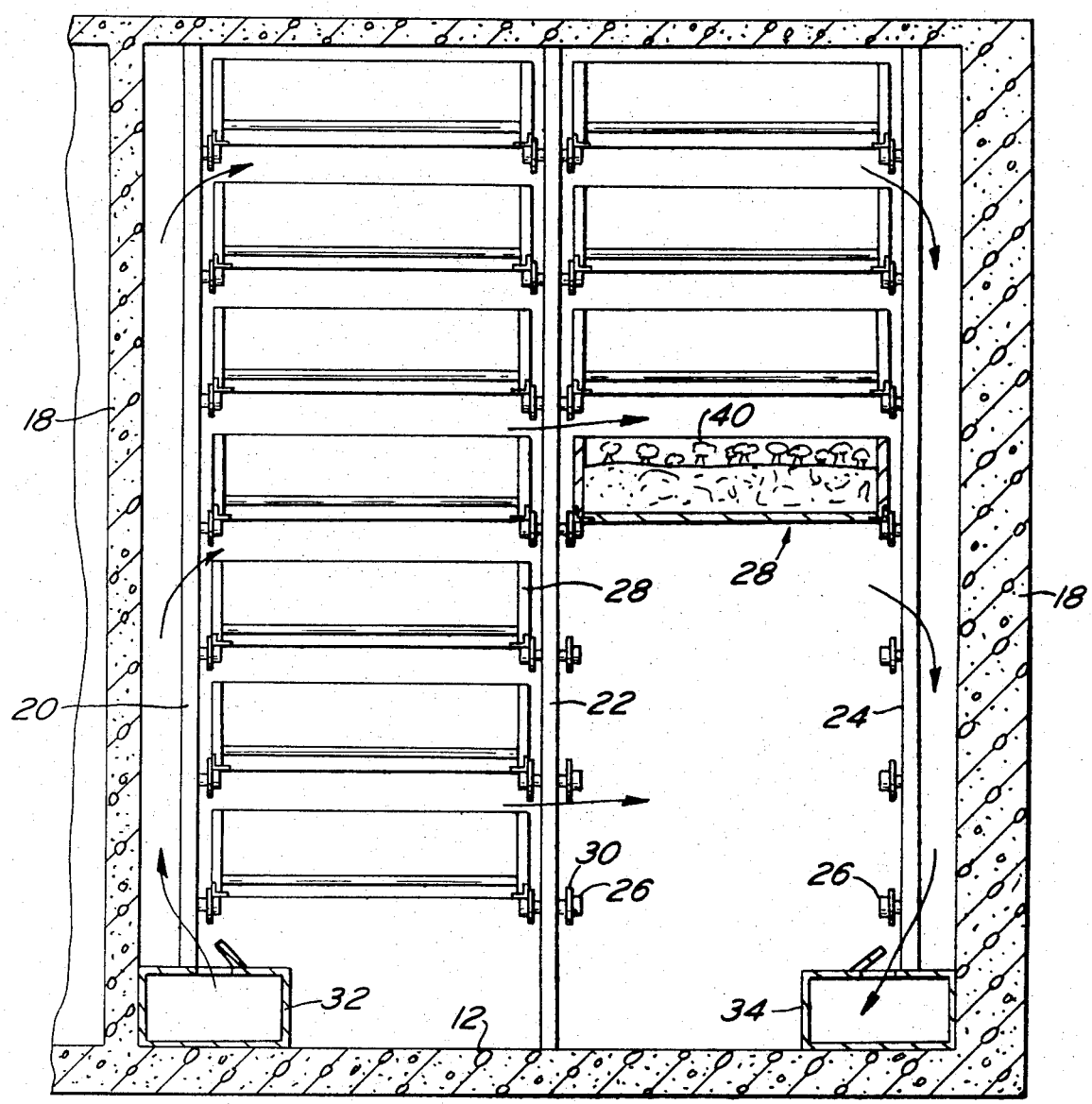
FIG. 3 is a detailed sectional view through a chamber but on an enlarged scale.
Figure 4:
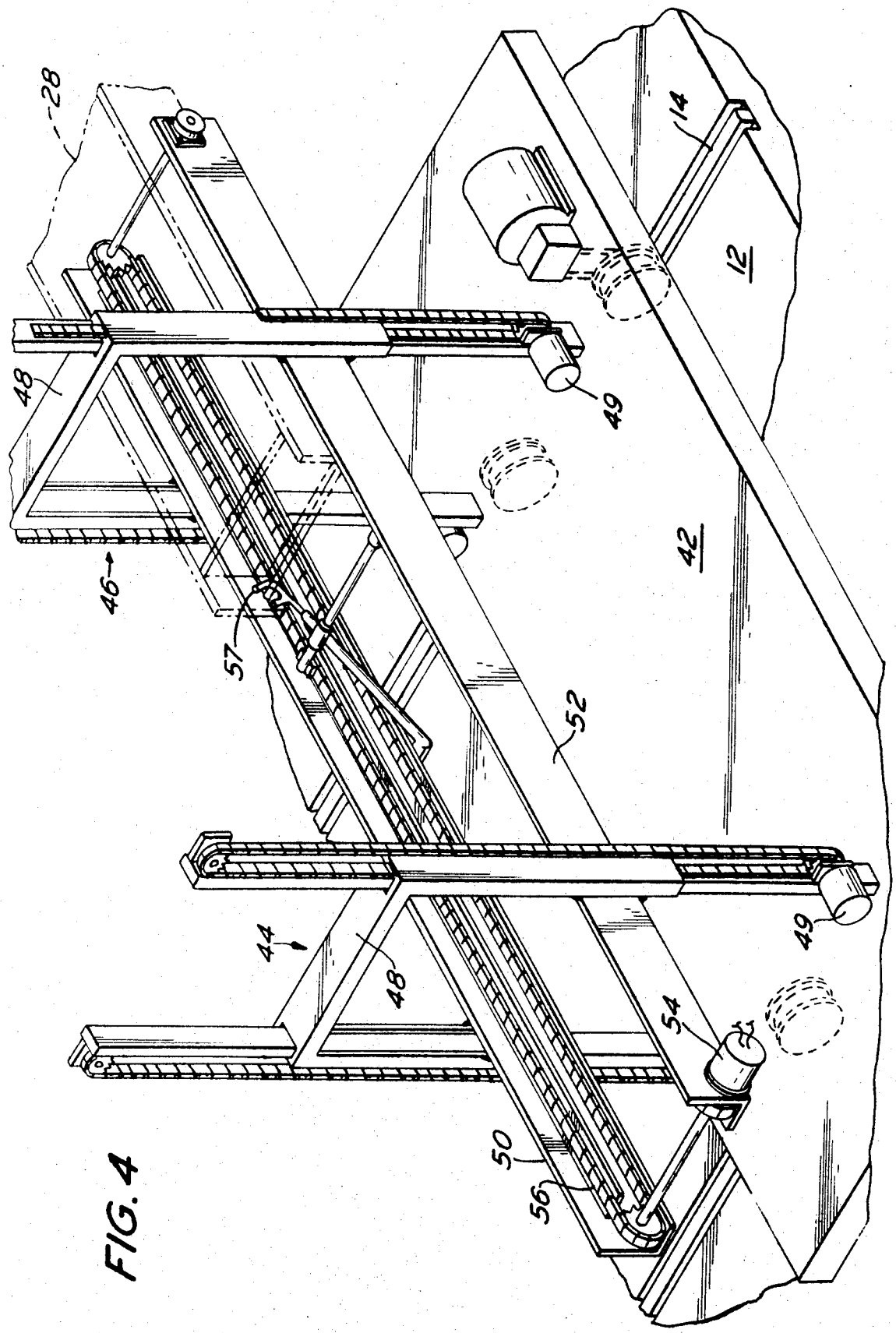
FIG. 4 is a perspective view showing a container being withdrawn from one of the air-conditioned chambers.
Figure 5:
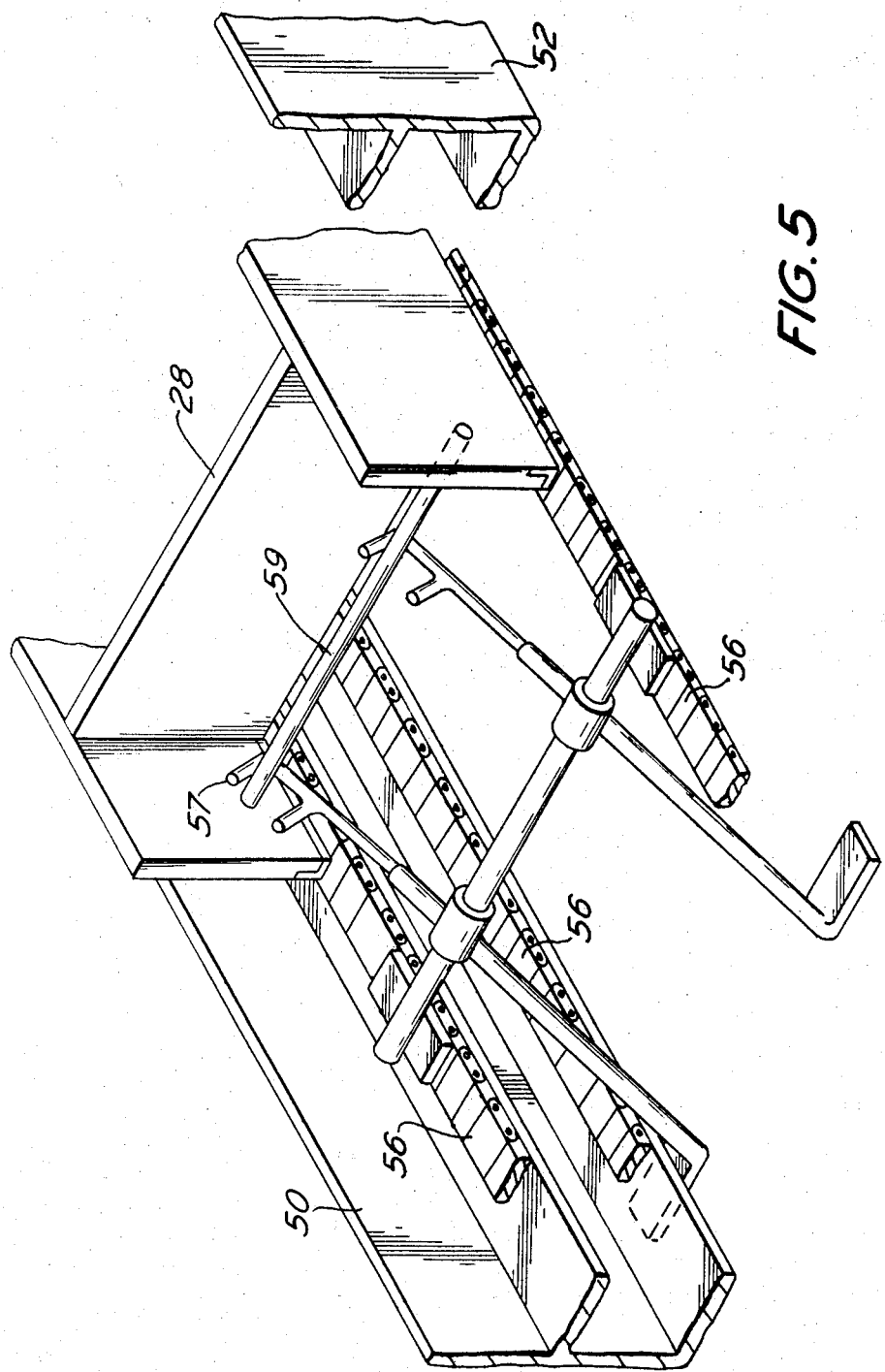
FIG. 5 is a partial perspective view of the righthand end of FIG. 4 but on an enlarged scale.

Referring to the drawing in detail, wherein like numerals indicate like elements, there is shown in FIG. 1 a structure designated 10 and incorporating the present invention. The structure 10 is in the form of a building having approximately one-half of the building subdivided into transverse parallel air-conditioned chambers 16. The other half of the structure includes a floor 12 having tracks 14 therein and perpendicular to the length of the air-conditioned chambers 16. The floor 12, except for the tracks 14, is unobstructed so that a receptacle moving and elevating device may reciprocate along the length of the tracks 14.

Each of the chambers 16 is defined by parallel vertical side walls 18. For purposes of illustration, each chamber 16 is sufficiently wide so as to receive two receptacles side-by-side. In FIG. 3, only three-quarters of the chamber 16 contains receptacles 28. The receptacles 28 have a length which is slightly less than the length of the chamber 16.

A plurality of vertically disposed racks 20, 22 and 24 are provided in each chamber 16 at spaced points therealong. Each of the racks has support rollers 26. As shown more clearly in FIG. 3, each roller 26 has a radially outwardly directed flange 30. The rack 22 is equidistant from the racks 20 and 24. Each receptacle 28 is reciprocally supported at its side edges for horizontal movement by the sets of rollers 26 on the adjacent racks 20 and 22 or 22 and 24.

Preconditioned air enters the chamber 16 by way of conduit 32, moves upwardly between the racks 20 and wall 18, and then horizontally in the space between adjacent receptacles. See FIG. 3. The preconditioned air is then removed by way of outlet conduit 34. Each outlet conduit 34 communicates with an outlet manifold 36 connected to the suction side of a pump. An inlet manifold 39 communicates with each inlet conduit 32. See FIG. 2.

As shown more clearly in FIG. 2, a door 38 provides access to each of the chambers 16. Each of the doors 38 may be opened so that one of the elongated receptacles 28 may be removed for processing of the nutrients and/or mushrooms 40 growing therein.

A platform 42 is provided with wheels in rolling engagement with tracks 14. The platform 42 supports first and second gantries 44, 46. Each gantry includes a portion 48 which is vertically reciprocable by means of a motor 49. The portions 48 support horizontally disposed platform members 50 and 52 which may have rollers on their upper surface. The platform members 50 and 52 are rigidly connected together and are movable in a vertical direction with the portions 48 so as to be aligned with the rollers 26 supporting any particular one of the receptacles 28. A motor 54 on platform member 52 drives sprockets on each platform member 50, 52 at one end thereof. Each of the members 50, 52 is provided with sprockets at the other end thereof. The chain 56 extends around the sprockets on each of the members 50, 52. A jaw member 57 connected to the chains 56, and movable therewith, is adapted to embrace a handle 59 on the end of the receptacle 28 to facilitate withdrawal and insertion of a receptacle 28 with respect to its particular chamber 16. When a receptacle 28 has been removed from its chamber, it is supported by the members 50, 52. Then, the contents of the receptacle are easily accessible so that they may be watered, picked, etc. The receptacles 28 may have a length of 40 feet and therefore are preferably made from sheet metal lined with wood.

During the cultivation of products such as mushrooms, the temperature of the chamber 16 is kept constant. Temperature may be controlled in any convenient manner such as has been disclosed in the above-mentioned pending application, with suitable controls or shutter valves provided where desired. The circulation of air is across the width of each receptacle in the space between two receptacles which are disposed one above the other. As will be apparent from FIG. 3, substantially the entirety of the height and width of the chamber 16 will be occupied by receptacles 28. The space above the uppermost receptacle 28 in FIG. 3 as well as the space below the lowermost receptacle 28 corresponds generally to the space between adjacent receptacles 28.

Use of the apparatus 10 may be as follows. Door 38 to a selected chamber 16 is moved to an open position. Platform 42 is moved to a position opposite the selected chamber 16. Motors 49 are operated to lower members 50, 52 to an elevation below the elevation of a selected receptacle 28. Motor 54 is then operated to move jaw member 57 until the latter is below handle 59. Then motors 49 are operated to move members 50, 52 upwardly until jaw member 57 embraces handle 59.

The motor 54 is then operated to cause jaw member 57 and chains 56 to pull receptacle 28 out of chamber 16. When this occurs, receptacle 28 moves off its supporting rollers 26 and onto the members 50, 52. If necessary, motors 49 may raise or lower the receptacle 28 to a desired elevation. Thereafter, the above described processing steps such as adding fertilizer, covering with earth, watering and harvesting may be performed. Thereafter, the sequence of steps may be reversed to replace the receptacle 28 on its rollers 26 within the chamber 16 from which it was withdrawn.

After each of the receptacles 28 in any particular chamber 16 has been processed and recycled, the moving and elevating device shown in FIG. 3 may be reciprocated along the tracks 14 to the next chamber.

The apparatus of this invention is designed to have a capacity of about one-tenth the capacity of the apparatus in said application. The receptacles 28 have a length which is at least eight times its width. Thus, the apparatus of the present invention provides a small but inexpensive mechanized arrangement for cultivating mushrooms, chickory, asparagus, etc.

The present invention may be embodied in other specific forms without departing from the spirit or essential attributes thereof and, accordingly, reference should be made to the appended claims, rather than to the foregoing specification as indicating the scope of the invention.

We claim:

1. Apparatus for processing elongated open top receptacles adapted for use in the cultivation of plants such as mushrooms comprising a structure having parallel elongated air-conditioned chambers on one floor level, a separate access opening for each chamber, elongated open top receptacles, means in each chamber for supporting opposite side edge portions of said receptacles, said receptacles being disposed one above the other and spaced from one another in said chambers, each receptacle being mounted on its supporting means for reciprocation in a lengthwise direction of the receptacles through the access opening of its chamber, means for removing receptacles from their respective chamber through the associated access opening and for temporarily supporting the receptacles for processing before return to their respective chamber by way of said access opening, said removing means including an elevating means for changing the elevation of a receptacle supported thereby, said removing means being supported by said structure for reciprocation along one end of said chambers at said one floor level, and said removing means having a device thereon for horizontally removing each receptacle lengthwise from its chamber.

2. Apparatus in accordance with claim 1 wherein said moving and elevating means includes first and second gantries, each gantry including a portion which is movable in a vertical direction, said platform members being connected to said movable portions of the gantry.

3. Apparatus in accordance with claim 1 wherein said device includes a jaw member for embracing a portion of the receptacle.

4. Apparatus in accordance with claim 1 wherein the receptacles are sheet metal receptacles lined with wood and have a length which is in excess of eight times the width of the receptacles.

5. Apparatus in accordance with claim 1 including oppositely disposed rollers in said chambers, said rollers being the supporting means in said chambers for supporting opposite side edge portions of said receptacles.

6. Apparatus in accordance with claim 5 wherein at least some of said chambers have two aligned sets of rollers at the same elevation so that receptacles may be reciprocally supported side-by-side within the chamber.

* * * * *